United States Patent
Elliot et al.

(10) Patent No.: US 9,870,205 B1
(45) Date of Patent: Jan. 16, 2018

(54) STORING LOGICAL UNITS OF PROGRAM CODE GENERATED USING A DYNAMIC PROGRAMMING NOTEBOOK USER INTERFACE

(71) Applicant: Palantir Technologies Inc., Palo Alto, CA (US)

(72) Inventors: Mark Elliot, New York City, NY (US); Punyashloka Biswal, New Haven, CT (US); Ankit Shankar, Palo Alto, CA (US); Omar Ali, Abu Dhabi (AE); John Chakerian, Los Altos Hills, CA (US); Ben Duffield, London (GB); Adam Borochoff, New York City, NY (US)

(73) Assignee: PALANTIR TECHNOLOGIES INC., Palo Alto, CA (US)

(*) Notice: Subject to any disclaimer, the term of this patent is extended or adjusted under 35 U.S.C. 154(b) by 0 days.

(21) Appl. No.: 14/845,001

(22) Filed: Sep. 3, 2015

Related U.S. Application Data

(60) Provisional application No. 62/097,388, filed on Dec. 29, 2014.

(51) Int. Cl.
*G06F 9/44* (2006.01)
*G06F 9/45* (2006.01)

(52) U.S. Cl.
CPC . *G06F 8/33* (2013.01); *G06F 8/41* (2013.01)

(58) Field of Classification Search
CPC .......... G06F 11/3664; G06F 8/34; G06F 8/38; G06F 11/362; G06F 8/20; G06F 11/3612; G06F 11/3624; G06F 8/30; G06F 11/3668
See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |

(Continued)

FOREIGN PATENT DOCUMENTS

| | | |
|---|---|---|
| DE | 102014103482 | 9/2014 |
| DE | 102014215621 | 2/2015 |

(Continued)

OTHER PUBLICATIONS

Sanner, Michel F. "Python: a programming language for software integration and development." J Mol Graph Model 17.1 (1999): 57-61. Retrieved on [Sep. 13, 2017] Retrieved from the Internet:URL<https://pdfs.semanticscholar.org/409d/3f740518eafcfaadb054d9239009f3f34600.pdf>.*

(Continued)

*Primary Examiner* — Thuy Dao
*Assistant Examiner* — Cheneca Smith
(74) *Attorney, Agent, or Firm* — Knobbe Martens Olson & Bear LLP

(57) ABSTRACT

The programming notebook system, methods, and user interfaces described herein provide software developers with enhanced tools by which a programming notebook workflow and session history associated with code cells in a programming notebook may be tracked and maintained. As a developer progresses through a development workflow, the developer can select an option to save a program code card representing some or all of the program code cell inputs. A card editor user interface may present an aggregated listing of all program code the developer has provided across multiple code cells during the current session which the developer can edit, refine, and/or comment. The card editor may also allow the developer to add associated user interface code to display a UI component associated with the program code card, and allow the developer to add a (Continued)

description and tags for the card so that the card can be searched for and reused.

13 Claims, 6 Drawing Sheets

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Joseph |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,666 B2 * | 9/2011 | Thompson ............ G06Q 10/00 345/440 |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,434,068 B2 * | 4/2013 | Wrighton ................ G06F 8/20 717/124 |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,494,984 B2 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |

(56) References Cited

U.S. PATENT DOCUMENTS

| | | |
|---|---|---|
| 8,799,799 B1 | 8/2014 | Cervelli et al. |
| 8,812,947 B1 | 8/2014 | Maoz et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,972,899 B2 | 3/2015 | Carlsson et al. |
| 8,990,686 B2 * | 3/2015 | Lin .................. G06F 3/0488 715/200 |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,116,975 B2 | 8/2015 | Shankar et al. |
| 9,299,173 B2 * | 3/2016 | Rope .................. G06T 11/206 |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | McPherson et al. |
| 2004/0193600 A1 | 9/2004 | Kaasten et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2008/0005677 A1 * | 1/2008 | Thompson .......... G06Q 10/00 715/744 |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0018994 A1 * | 1/2009 | Hajdukiewicz ... G06F 17/30389 |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0017788 A1 * | 1/2010 | Bronkhorst ............ G06F 8/34 717/125 |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |

(56) References Cited

U.S. PATENT DOCUMENTS

| | | |
|---|---|---|
| 2010/0100963 A1 | 4/2010 | Mahaffey |
| 2010/0103124 A1 | 4/2010 | Kruzeniski et al. |
| 2010/0107146 A1* | 4/2010 | Wrighton ............ G06F 11/3664 717/134 |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0313157 A1 | 12/2010 | Carlsson et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0154295 A1* | 6/2011 | Aharoni ................ G06F 8/74 717/125 |
| 2011/0161096 A1 | 6/2011 | Buehler et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0313947 A1* | 12/2012 | Rope .................... G06T 11/206 345/440 |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111319 A1* | 5/2013 | Lin ...................... G06F 3/0488 715/209 |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275904 A1* | 10/2013 | Bhaskaran ............ G06F 3/048 715/771 |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0164964 A1* | 6/2014 | Cannon ................ G06T 11/206 715/765 |

(56) References Cited

U.S. PATENT DOCUMENTS

| | | |
|---|---|---|
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0267294 A1 | 9/2014 | Ma |
| 2014/0267295 A1 | 9/2014 | Sharma |
| 2014/0279824 A1 | 9/2014 | Tamayo |
| 2014/0281730 A1* | 9/2014 | Chazan ............... G06F 11/3636 714/38.1 |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2015/0019394 A1 | 1/2015 | Unser et al. |
| 2015/0026622 A1* | 1/2015 | Roaldson ............... G06F 3/0484 715/771 |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0227295 A1 | 8/2015 | Meiklejohn et al. |

FOREIGN PATENT DOCUMENTS

| | | |
|---|---|---|
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911100 | 8/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

Pérez et al. "IPython: a system for interactive scientific computing." Computing in Science & Engineering 9.3 (2007).Retrieved on [Sep. 13, 2017] Retrieved from the Internet: URL<https://pdfs.semanticscholar.org/409d/3f740518eafcfaadb054d9239009f3f34600.pdf>.*

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilia.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analvsis-using-the-huff-model/123411.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Hansen et al. "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Huff et al., "Calibrating the Huff Model Using ArcGIS Business Analyst," ESRI, Sep. 2008, pp. 33.

(56) References Cited

OTHER PUBLICATIONS

Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The Blast Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
"Potential Money Laundering Warning Signs," snapshot taken 2003, https://web.archive.org/web/20030816090055/http://finsolinc.com/ANTI-MONEY%20LAUNDERING%20TRAINING°GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," http://searchdatamanacernent.techtarget.com/definition/OLAP-cube, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.

(56) References Cited

OTHER PUBLICATIONS

Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2013306 dated Apr. 24, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.

(56) References Cited

OTHER PUBLICATIONS

Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 15/392,168 dated Feb. 27, 2017.
IBM Cognos software—Business Intelligence, https://www.ibm.com/analytics/us/en/technology/cognos-software/, as printed Feb. 15, 2017 in 7 pages.
IBM Cognos Analytics, https://www-03.ibm.com/software/products/en/cognos-analytics, as printed Feb. 15, 2017 in 2 pages.
WebsterAnalytics, "Presenting IBM Cognos Analytics," available at https://www.youtube.com/watch?v=_cLwCyDzfY, as published on Nov. 29, 2015.
IBM Cognos Analytics, "Quick Dashboard Creation with Cognos Analytics," available at https://www.youtube.com/watch?v8OVXkKDoL8Y, as published on Oct. 26, 2015.
Senturus, "Getting Started with IBM Cognos BI," available at https://www.youtube.com/watch?y=SCEXckRaAl, as published on Mar. 20, 2015.
IBM Cognos Analytics, "Cognos Dynamic Cubes," available at https://www.youtube.com/watch?v.=T1HrJlWBrfE, as published on Dec. 3, 2014.
IBM Knowledge Center, "Maps," https://www/ibm.com/support/knowledgecenter/SSRL5J_1.01/com.ibm.swg.ba.cognos.ug_cr_rptstd.10.1.1.doc/c_cr_rptstd_reptyp_maps.html, as printed Feb. 16, 2017 in 1 page.
IBM Knowledge Center, "IBM Cognos Analytics new features 11.0," https://www.ibm.com/support/knowledgecenter/en/SSEP7J_11.0.0/com.ibm.swg.ba.cognos.ca_new.doc/c_ca_nf_11_0_x.html, as printed Mar. 6, 2017 in 8 pages.
IBM Knowledge Center, "IBM Cognos Analytics | Visualizations," https://www.ibm.com/support/knowledgecenter/en/SSEP7J_11.0.0/com.ibm.swg.ba.cognos.ug_ca_dshb.doc/wa_an_visualizations_intro.html, as printed Mar. 6, 2017 in 2 pages.
IBM Knowledge Center, "Creating a data module," https://www.ibm.com/support/knowledgecenter/SSEP7J_11.0/com.ibm.swg.ba.cognos.ca_, rndig.doc/c_data_modules.html, as printed Mar. 6, 2017 in 1 page.
IBM Support, "Software lifecycle—Cognos Analytics 11.0.x," https://www-01.ibm.com/software/support/lifecycleapp/PLCDetail.wss?q45=K177789J28225R03, as printed Mar. 7, 2017 in 1 page.
IBM Predictive Analytics, http://www.ibm.com/analytics/us/en/technology/predictive-analytics/, as printed Feb. 15, 2017 in 12 pages.
IBM SPSS Modeler, https://www.ibm.com/us-en/marketplace/spss-modeler, as printed Feb. 15, 2017 in 5 pages.
IBM Analytics, "IBM SPSS software and Watson Analytics: A powerful combo for the cognitive age," available at https://www.youtube.com/watch?v=AvYctzFf8gc, as published on Apr. 14, 2016.
Armand Ruiz, "Watson Analytics, SPSS Modeler and Esri ArcGIS," available at https://www.youtube.com/watch?v=lk49hw4OrN4, as published on Jul. 28, 2015.
IBM Knowledge Center, "Merge Node," https://www.ibm.com/support/knowledgecenter/en/SS3RA7_15.0.0/com.ibm.spss.modeler.help/merge_overview.htm[ibm.com], as printed Feb. 14, 2017 in 1 page.
IBM Knowledge Center, "New features in IBM SPSS Modeler Professional," https://www.ibm.com/support/knowledgecenter/en/SS3RA7_15.0.0/com.ibm.spss.modeler.help/whatsnew_features_pro.htm[ibm.com], as printed Feb. 14, 2017 in 2 pages.
IBM Knowledge Center, "Overview—What's new in IBM Watson Explorer Content Analytics Version 10.0," https://www.ibm.com/support/knowledgecenter/en/SS8NLW_10.0.0/com.ibm.discovery.es.nav. doc/llysawhatsnew.htm, as printed Mar. 6, 2017 in 4 pages.
Yates, Rob, "Introducing the IBM Watson Natural Language Classifier," IBM developerWorks/Developer Centers, posted Jul. 10, 2015 in 4 pages, https://developer.ibm.com/watson/blog/2015/07/10/the-ibm-watson-natural-language-dassifier/.
Goyal, Manish, "Announcing our largest release of Watson Developer Cloud services," IBM developerWorks/Developer Centers, posted Sep. 24, 2015 in 6 pages, https://developer.ibm.com/watson/blog/2015/09/24/announcing-our-largest-release-of-watson-developer-cloud-services/.
IBM Analytics Communities, "Is IBM SPSS statistics now integrated to WatsonAnalytics?" https://community.watsonanalytics.com/discussions/questions/1464/Is-ibm-spss-statistics-now-integrated-to-watsonana.html, as printed Mar. 7, 2017 in 2 pages.
IBM Support, "Software lifecycle—Watson Explorer 10.0.0," https://www-01.ibm.com/software/support/lifecycleapp/PLCDetail.wss?g45=T283072T66911H98, as printed Mar. 7, 2017 in 1 page.
IBM Analytics Communities, "Creating a map visualization for UK coordinates," https://community.watsonanalytics.com/discussions/questions/3753/creating-a-map-visualisation-for-uk-coordinates.html, as printed Mar. 9, 2017 in 1 page.
Esri News, "IBM and Esri Team Up to Offer Cognitive Analyrics and IoT in the IBM Cloud," http://www.esri.com/esri-news/releases/16-4qtr/ibm-and-esri-team-up-to-offer-cognitive-analytics-and-iot-in-the-ibm-cloud, as published on Oct. 26, 2016, in 2 pages.

* cited by examiner

STORING LOGICAL UNITS OF PROGRAM CODE GENERATED USING A DYNAMIC PROGRAMMING NOTEBOOK USER INTERFACE

CROSS-REFERENCE TO RELATED APPLICATIONS

This application claims priority from provisional U.S. Pat. App. No. 62/097,388, filed on Dec. 29, 2014, which is hereby incorporated by reference in its entirety.

BACKGROUND

Programming notebooks have become a valuable asset in a software developer's toolkit. A programming notebook, such as the popular iPython Notebook, allows a developer to more rapidly develop and test code, typically by enabling a dynamic command-line shell interface which the developer can use to input, execute, and view associated outputs for lines of program code in a read-execute-print loop ("REPL"). Programming notebook outputs can be provided in various formats, such as a JavaScript Object Notation ("JSON," which is a lightweight data-interchange format) document containing an ordered list of input/output cells which can contain code, text, mathematics, plots and rich media. Programming notebook outputs can also be converted to a number of open standard output formats (HTML, HTML presentation slides, LaTeX, PDF, ReStructuredText, Markdown, Python, etc.).

Typically, a programming notebook consists of a sequence of cells. A cell is a multi-line text input field, and its contents can be executed by the developer using the programming notebook interface. Code cells allow the developer to edit and write code and can provide features such as syntax highlighting and tab completion. When a cell is executed using a backend system associated with the programming notebook, results are displayed in the notebook as the cell's output. Output can be displayed in a variety of formats such as text, data plots, and tables.

In a normal programming notebook workflow, the developer can edit cells in-place multiple times until a desired output or result is obtained, rather than having to re-run separate scripts. The programming notebook interface enables the developer to work on complex computational programs in discrete and manageable pieces. The developer can organize related programming ideas into cells and work progressively forward as various pieces are working correctly. Once a developer has completed a workflow, the programming notebook can be saved or downloaded into a format which, among other things, may remove output results and convert some cell contents (e.g., some contents may be converted to non-executable comments in an output programming language).

SUMMARY

One embodiment comprises a computing system for providing a programming notebook, the computing system comprising: one or more hardware computer processors configured to execute software code; a non-transitory storage medium storing software modules configured for execution by the one or more hardware computer processors. The software modules may comprise at least: a code compiler and execution module configured to: receive, on behalf of a user interacting with a programming notebook user interface in a programming session, a request to execute a unit of program code associated with a program cell in the programming notebook user interface, wherein the unit of program code comprises one or more lines of program code; execute, on behalf of the user, the unit of program code; provide an output result associated with the execution of the unit of program code, wherein the output result is configured for display in association with the program cell in the programming notebook user interface; and a program code card management module configured to: maintain a session history of requests to execute units of program code and associated output results; receive a request to generate a program code card for the programming session; provide a program code card editor user interface including at least an aggregate listing of the lines associated with respective units of program code associated with the session history; receive, via the program code card editor user interface, user input comprising a selection of program code for the program code card; and generate the program code card based at least in part on the user input.

In another embodiment, the user input further comprises at least some user interface code. In another embodiment, the user input further comprises at least a description or a tag for the program code card. In another embodiment, providing the output result associated with the execution of the unit of program code comprises: analyzing the output result to determine a data type associated with the data type; selecting a data visualization user interface component to include with the output result based at least in part on the data type; generating, based on the output result, a data visualization user interface component; and provide the data visualization user interface component with the output result. In another embodiment, the data visualization user interface component is one of a time series, a scatter plot, a histogram, a chart, a bar graph, or a table. In another embodiment, based on a determination that the data type is a date the data visualization user interface component is a time series. In another embodiment, based on a determination that the data type is a geographic unit of measurement, the data visualization user interface component is a map.

Another embodiment comprises a computer-implemented method comprising: under control of a hardware computing device configured with specific computer executable instructions: maintaining a session history of requests to execute units of program code received in association with a programming notebook user interface in a programming session, wherein respective units of program code are associated with respective program cells in the programming notebook user interface; receiving a request to generate a program code card for the programming session; providing a program code card editor user interface including at least an aggregate listing of the units of program code associated with the session history, wherein the aggregate listing includes, for each unit of program code, an indicator label of the associated program cell in the programming notebook user interface; receiving, via the program code card editor user interface, user input comprising a selection of program code for the program code card; and generating the program code card based at least in part on the user input.

DETAILED DESCRIPTION OF SPECIFIC EMBODIMENTS

Overview

Figure 1:
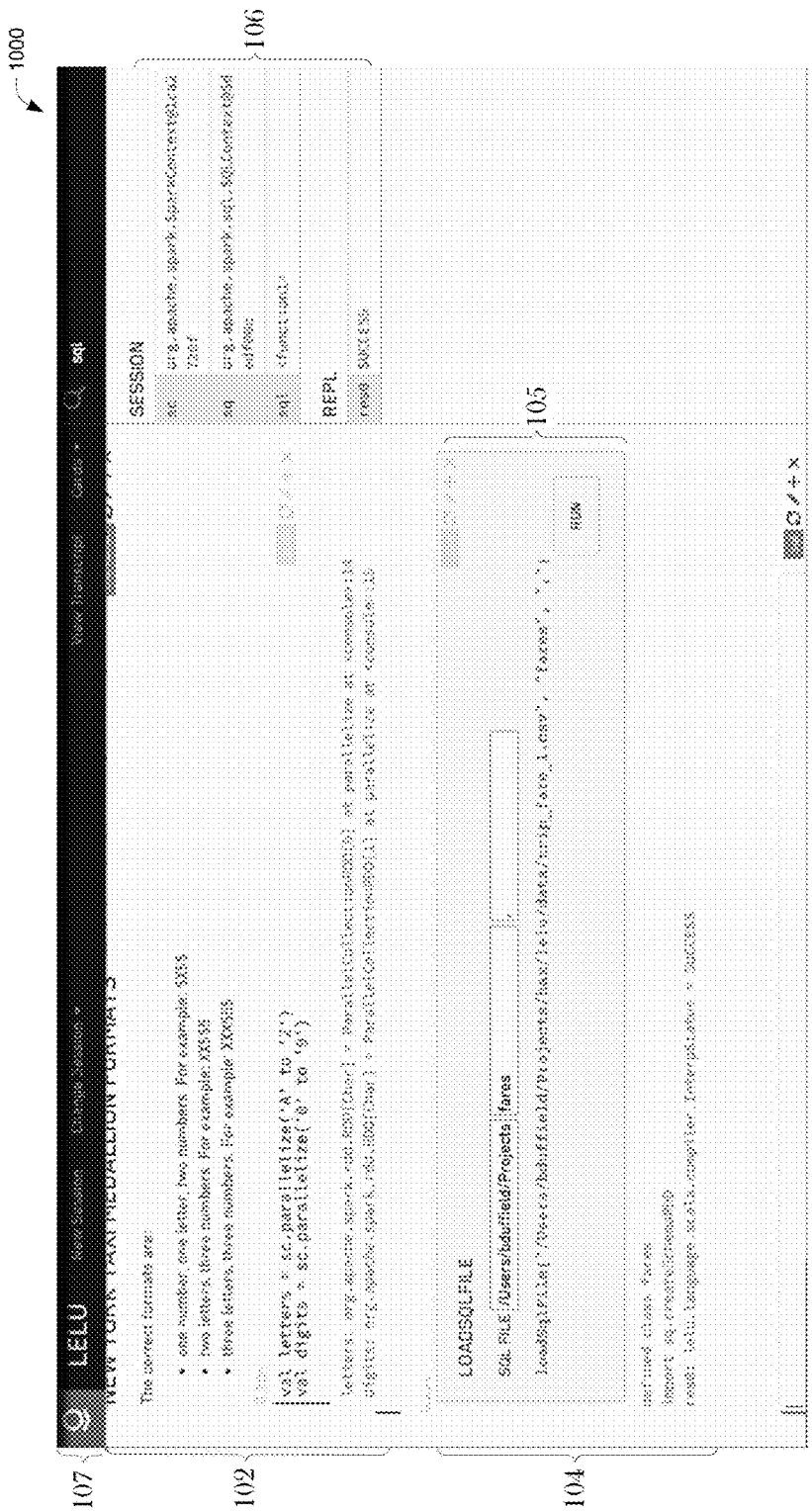
FIG. 1 illustrates an example programming workflow user interface for a programming notebook including a program code card component, as generated using one embodiment of the programming notebook system of FIG. 6.

One drawback to existing programming notebook user interfaces and workflows is that the final output tends to be static, susceptible to inadvertent edits and difficult to reverse format corruption if manually edited, and generally does not lend itself well to facilitating re-use, re-execution, or sharing of code developed using the programming notebook interface. For example, using traditional programming notebook user interfaces a developer, in order to re-use code or logic a developer is often required to resort to copying-and-pasting blocks of program logic or code from one notebook to another. As a result, if a bug in the program logic or code is identified, it may only be fixed once in the location it is found; the other "copy" would not be automatically updated, and in many cases the developer that identified and fixed the bug may be unaware that a copy in another notebook may also need to be fixed or updated accordingly. It may never be clear which version of the program logic or code is the "canonical" or master version, and the developer may not even know that other copies of the program logic or code exist in one or more other notebooks.

As another example of how traditional programming notebook user interfaces are deficient relates to reordering or deleting of cells of program logic in the notebook. Using these functions, a developer may perform some logic development and analysis, and then reorder or delete cells in the analysis workflow such that the notebook may become inconsistent, and in some cases may no longer be "run" from top to bottom because the logic has become inconsistent, invalid, or even corrupt. Other programming environments which utilize or support a REPL-type interface and copying/pasting of code logic may suffer similar failings.

The programming notebook system, methods, and user interfaces described in this disclosure provide the developer with an enhanced tool by which the workflow and session history associated with code cells in a programming notebook are tracked and maintained. As the developer progresses through a development workflow, when desired outcome results are achieved, the developer can select an option to save a program code card representing some or all of the code cell inputs. A card editor user interface may provide the developer with a code editor input panel which presents an aggregated listing of all program code the developer has provided across multiple code cells during the current session. The developer can edit, refine, comment, and/or otherwise clean-up the aggregated code listing, such as by removing intermediate lines of code which were rendered unnecessary by other lines of code, editing code to refine definitions, adding comments to document the code and what it does, and so on. The card editor may also allow the developer to add associated user interface code to display a UI component associated with the program code card. The card editor may also allow the developer to add a description and tags for the card so that the card can be searched for and reused by other developers using the programming notebook system.

Once a program code card has been generated and stored by the programming notebook system it is added to a searchable card library. Developers can then search for and add cards to their own programming notebook workflows and leverage the work done by other developers. Cards may be used within a cell in the workflow, for example directly as a call to a function defined by the card or by interaction with an associated UI component defined by the card. For example, a UI component may expose one or more text input boxes corresponding to input parameters for a function defined by the card.

One potential benefit of enabling re-use of cards in the workflow is that cards can be built on top of each other and saved into new cards, which include or reference program code defined in previous cards. Then, an end user can request to import a program code card into a programming session or workflow. The programming notebook system then imports the program code card into the programming session or workflow, such that the end user can execute, by providing user input to the programming notebook user interface, a unit of program code associated with the program code card.

Another feature provided by the programming notebook system described herein is enhanced output results which are provided based on introspection of the output results. For example, additional output results may be suggested based on data attributes associated with the output results and/or input parameters. Additional output results might include one or more interactive data visualization thumbnail images and UI controls presenting the output results, or a portion thereof, in various different formats (e.g., a time series, a histogram, a table, a heat map, etc.). Whether and which data visualization thumbnail images and UI controls are displayed may be based on the attributes and/or values of the data output. For example, if data attributes or values indicate the data includes map coordinates, a geographic map data visualization thumbnail image and UI control may be displayed. Or, in another example, if data attributes or values indicate the data includes dates and times, a time series data visualization thumbnail image and UI control may be displayed. Each interactive data visualization thumbnail image and UI control may be generated based on the actual output results be fully interactive such that, for example, if the developer selects the thumbnail a corresponding full or larger size data visualization may be displayed in the programming notebook user interface. Among other benefits this proactive prediction of data visualizations which may be relevant or useful to the developer can help streamline and improve the developer's workflow. For example, being able to quickly review output results can aid the developer in determining whether the program code used to generate the output results may need to be modified and in what ways in order to move closer to or achieve a desired result.

In one example, an introspection algorithm may be implemented as follows. A visualization may define a set of rules defining what the visualization requires of the underlying data. For example, for a heat map, the rules may specify that (1) the data must be in a tabular format, and (2) the table of data must contain two numeric columns, which are in correct, specified ranges for latitude and longitude (e.g., from negative 90 to positive 90 degrees, from negative 180 to positive 180 degrees). Or, as another example, for a line chart, the rules may specify that, in order to correctly plot a line, (1) if the data is a list of scalars, then the data must contain a set of numbers, or (2) if the data is a list of pairs, then the value of the first coordinate of each pair must be increasing over the list of pairs. Or, as yet another example, for a timeseries plot (e.g., one or more line charts overlaid with a time axis), the rules may specify that (1) the data must be in a tabular format and (2) one column in the table must be in a date-time format or parseable to a date-time format (e.g., an ISO 8601 date format). The rules for each data visualization may then be responsible for providing the data in a normalized form (e.g., for a timeseries, explicit ticks for values on the time axis may be specified). In addition, the rules may be "fuzzy" such that data can be matched to the rules (or the data may satisfy the criteria specified by the rules) in differing degrees. The visualizations may then be ranked based on the degree of match between the data and the rules. (For example, for a heat map, if the names of the columns identified in the table as providing latitude and longitude contain the substrings "lat" or "lon" then this may increase the confidence that a heat map is a valid visualization). The foregoing provides but one example of an introspection algorithm; other approaches may also be used, including various machine learning algorithms which may, for example, be implemented to train or learn over time which particular thumbnail a user actually picks.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For purposes of this disclosure, certain aspects, advantages, and novel features of various embodiments are described herein. It is to be understood that not necessarily all such advantages may be achieved in accordance with any particular embodiment of the invention. Thus, for example, those skilled in the art will recognize that one embodiment may be carried out in a manner that achieves one advantage or group of advantages as taught herein without necessarily achieving other advantages as may be taught or suggested herein.

Example User Interfaces

Figure 2:
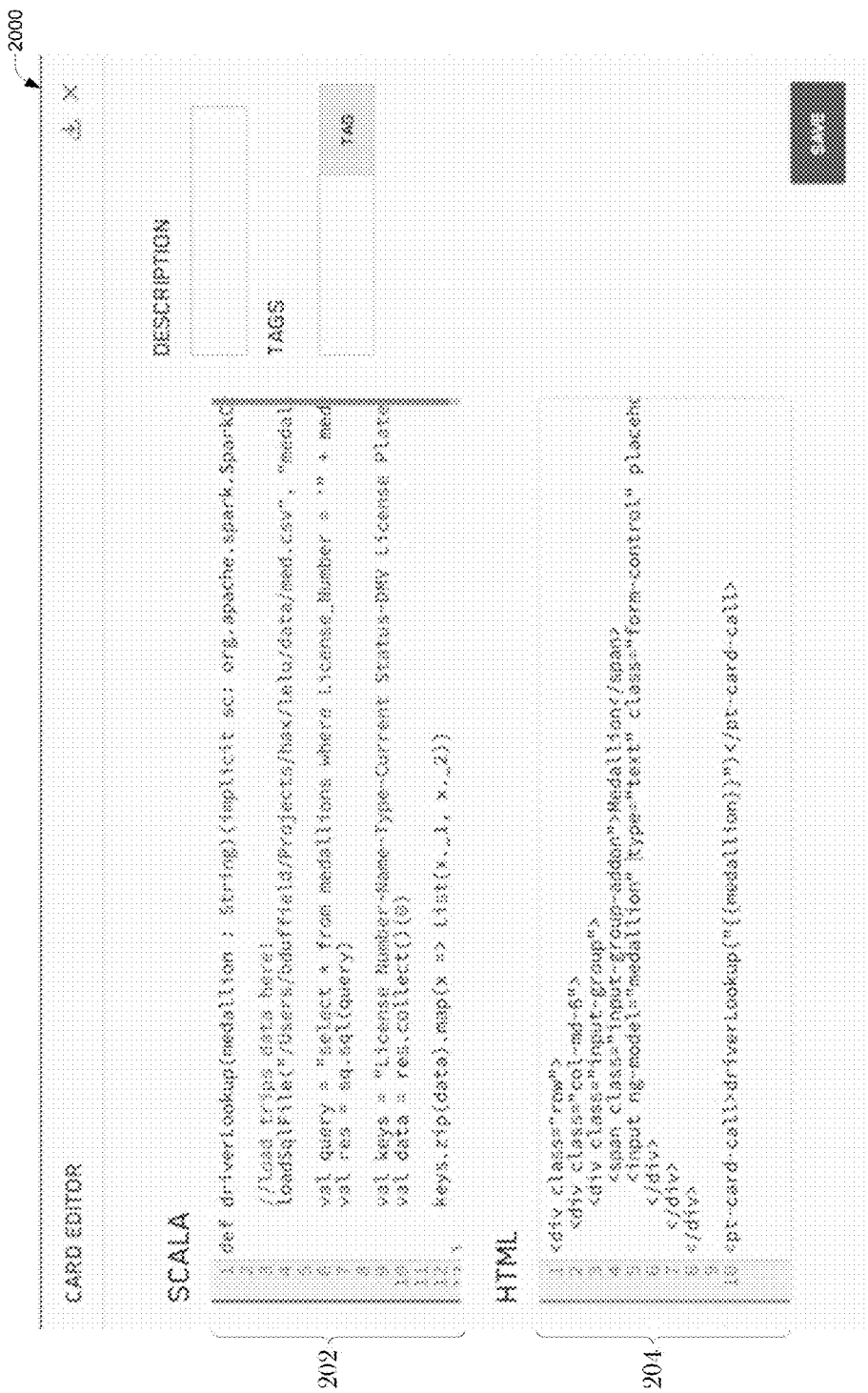
FIG. 2 illustrates an example card editor user interface for a programming notebook, as generated using one embodiment of the programming notebook system of FIG. 6.
Figure 3:
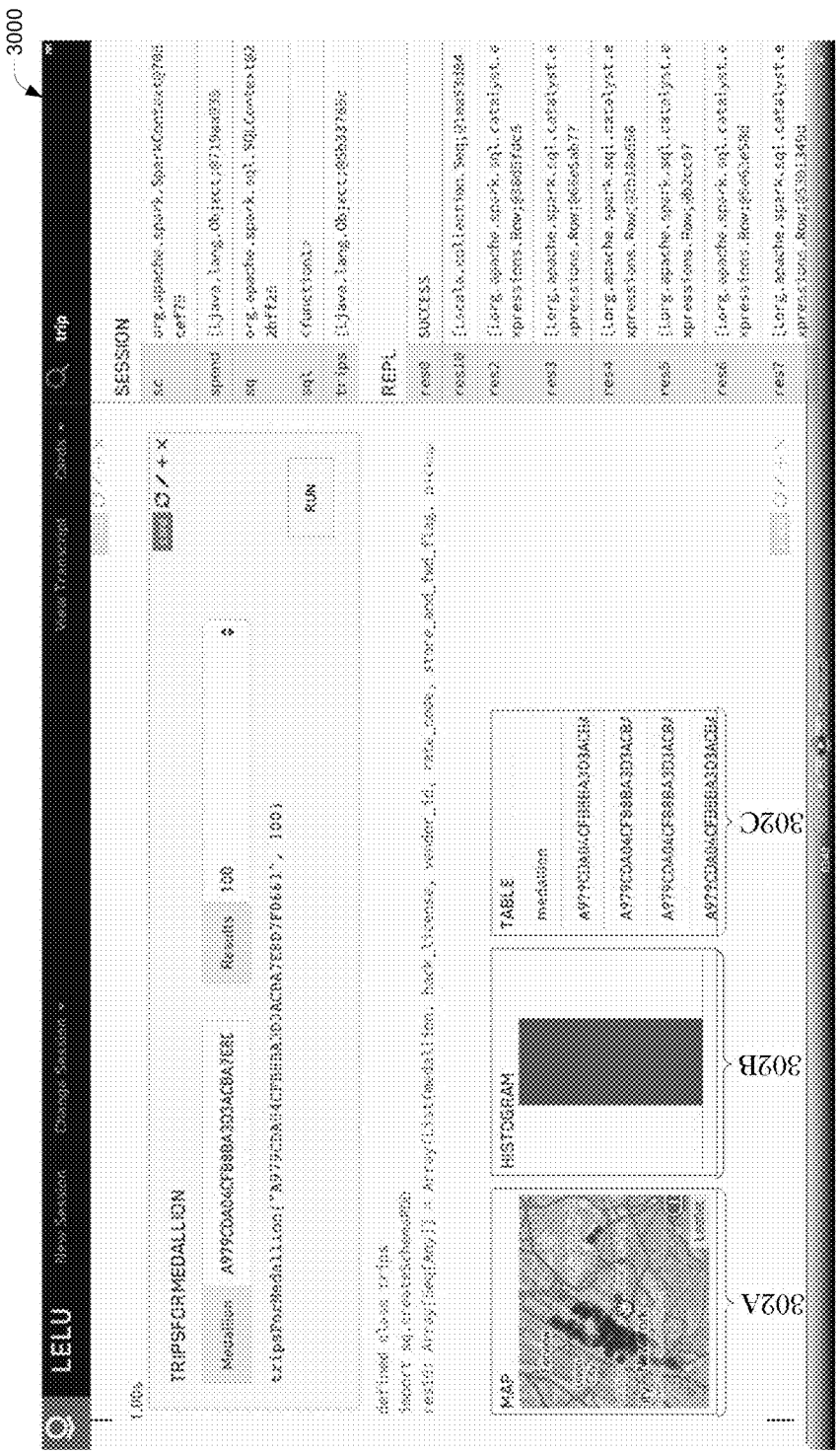
FIG. 3 illustrates an example programming workflow user interface for a programming notebook including one or more automatically generated data visualizations, as generated using one embodiment of the programming notebook system of FIG. 6.
Figure 6:
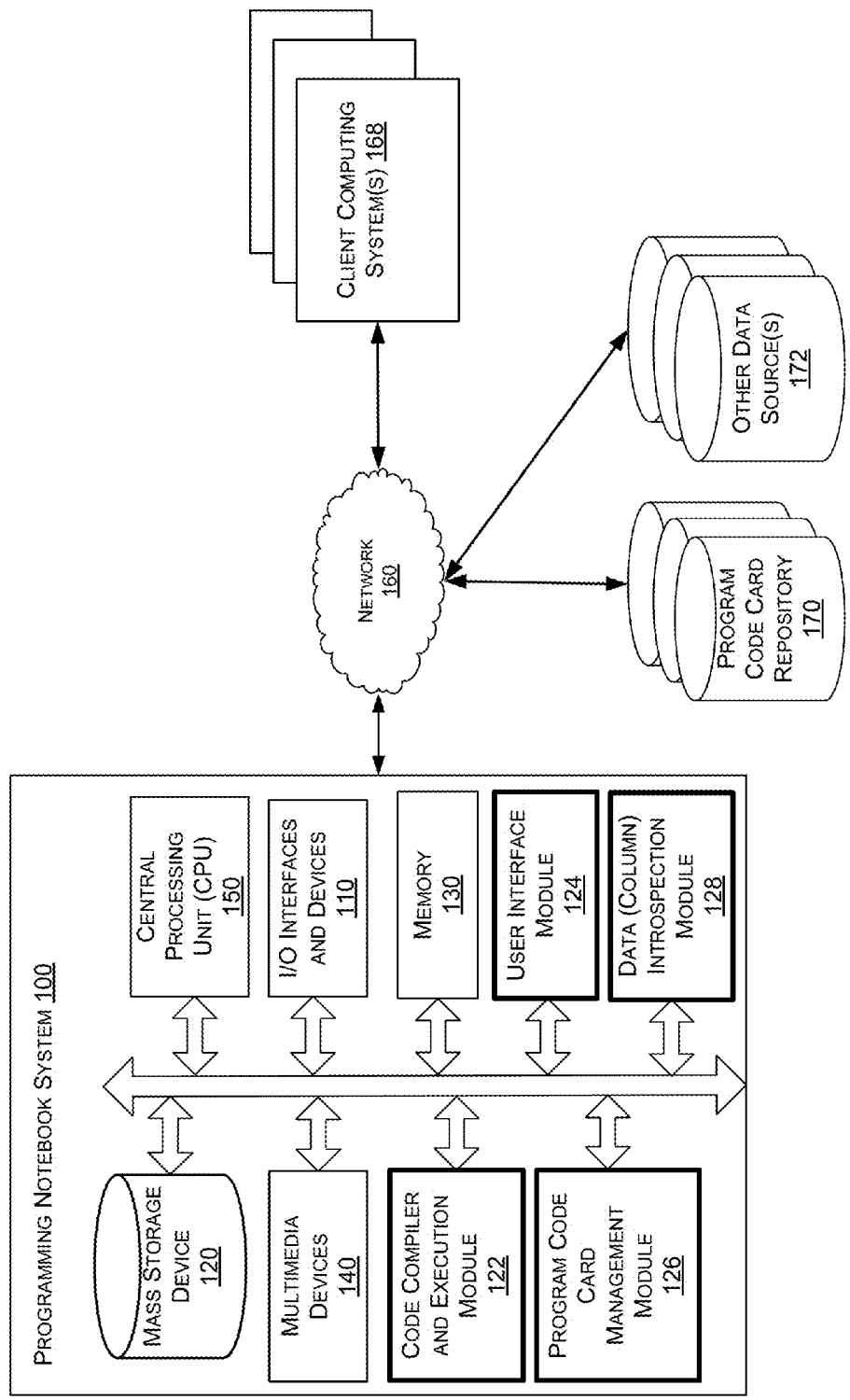
FIG. 6 is a block diagram of an implementation of an illustrative programming notebook system.

FIGS. 1, 2, and 3 illustrate example programming notebook user interfaces, as used in one or more embodiments of the programming notebook system 100 of FIG. 6. The sample user interfaces may be displayed, for example, via a web browser (e.g., as a web page), a mobile application, or a standalone application. However, in some embodiments, the sample user interfaces shown in FIGS. 1, 2, and 3 may also be displayed on any suitable computer device, such as a cell/smart phone, tablet, wearable computing device, portable/mobile computing device, desktop, laptop, or personal computer, and are not limited to the samples as described herein. The user interfaces include examples of only certain features that a programming notebook system may provide. In other embodiments, additional features may be provided, and they may be provided using various different user interfaces and software code. Depending on the embodiment, the user interfaces and functionality described with reference to FIGS. 1, 2, and 3 may be provided by software executing on the individual's computing device, by a programming notebook system located remotely that is in communication with the computing device via one or more networks, and/or some combination of software executing on the computing device and the programming notebook system. In other embodiments, analogous interfaces may be presented using audio or other forms of communication. In an embodiment, the interfaces shown in FIGS. 1, 2, and 3 are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 1 (split across illustrates an example programming workflow user interface 1000 for a programming notebook including a program code card component, as generated using one embodiment of the programming notebook system of FIG. 6. The programming workflow user interface 1000 may be displayed in association with a programming session and enable a developer to quickly and interactively compose and execute lines of program code and view associated output results.

The programming workflow user interface 1000 of FIG. 1 includes several illustrative program cells. Program cell 102 includes two lines of program code and respective printouts of results from execution of the two lines of program code. Each program cell may also include, for example, an execution time status indicator to indicate how long the program code took to execute. Each program cell may also include a submenu of available actions with respect to the program cell, which may include for example a label descriptor to describe a type of code or mode associated with the program cell (e.g., a programming language indicator such as "Scala," "python," "HTML," "JavaScript," "markdown," "sql," and so on; a card mode indicator to indicate that the program cell is being used to display or invoke a card; and other similar types of modes). The program cell submenu may also include an option to execute the program code in the cell, an option to edit the cell (e.g., the developer may return to a previous cell, edit the program cell contents, and re-run the program cell to produce updated output results); an option to expand the size of the input box (e.g., if the developer wishes to add more lines of code than available space allows); and an option to delete, remove, or otherwise discard the program cell from the current session.

Program cell 104 represents a program code card which has been added to the current session and invoked by the developer to call a particular function defined by the logic in the program code card. In this example the card in program cell 104 has an associated UI control 105, which may optionally be specified by a user when the card is created or edited. For example, the card included at program cell 104 displays a function label; three text input boxes for the input parameters used by the function; and a function call preview displaying the function to be called with the provided input parameters (e.g., "cardFunction(input1,input2)") when the program cell is executed. The UI control 105 for the card at program cell 104 also includes a "Run" button which the developer can select in order to run the card's program code. In some embodiments more advanced UI controls and inputs may be provided for the card, as specified by the developer using the card editor user interface (such as the one shown in FIG. 2). In other embodiments, no UI control 105 may be provided and the developer using the card may type the function call and input parameters (e.g., "card.cardFunction (input1,input2)") directly into the default text box provided by the program cell.

The programming workflow user interface 1000 may include a main menu 107 providing additional features for the programming notebook. For example, the programming notebook system 100 may support or enable the developer to launch multiple sessions and switch between them. Thus, a "new session" option may cause the programming notebook system 100 to display a clean copy of the programming workflow user interface 1000 (e.g., including one empty program cell for the developer to begin a new session workflow). Additionally, a "change session" option may allow the developer to switch between multiple active sessions. User selection of this option may cause the programming notebook system 100 to display a copy of the programming workflow user interface 1000 for the changed-to session (e.g., including any program cell(s) and result outputs associated with the changed-to session for the developer to continue the changed-to session workflow).

The main menu 107 in FIG. 1 may also include a transcript option for the developer to view a transcript of program code for the current session. The transcript can include an aggregate listing of the lines of program code input by the developer across all program cells for the current session, without the result outputs associated with each program cell. The transcript may be generated to automatically insert program cell identifiers as code comments to identify or delimit the contents of each respective program cell (e.g., "// cell 1," "// cell 2," etc.). In certain embodiments in which the developer has imported a program code card in the programming workflow user interface, the transcript view may be generated to include (1) the function or code used to invoke the underlying code associated with the card, (2) the underlying code, and/or (3) an option to toggle or switch between (1) and (2).

As the developer progresses through a workflow and the number of program cells used in the current session increases, the transcript may be updated to reflect the current session. If a developer returns to or re-uses a program cell, the program cell identifiers may indicate this in some manner, such as with a revised identification, timestamp, or other way. For instance, a revised and/or re-executed program cell may be added as a new cell in the session history and associated transcript.

The main menu in FIG. 1 may also include a card menu option for the developer to create a new card from program code used in the current session, and/or to search for and add cards from a library of cards which have been created by the developer and/or other developers using the programming notebook system of FIG. 6. An example card editor user interface is illustrated and described in more detail with reference to FIG. 2. Saved cards may be stored, searched, and accessed, for example, from the program code card repository 122. Cards may be searched based on a name, a description, and/or one or more tags, as well as other searchable attributes (including in some cases the underlying code associated with the card) provided by the developer when the card is created or edited.

The programming workflow user interface 1000 may also include a session UI panel 106 which lists, for the current session, variables and their current values and/or functions which have been defined. For example, the session panel 106 listing includes, among other things, variables for "sc" and "sq" and a sql function "<function1>." The programming workflow user interface 1000 may also include a REPL UI panel which lists a summary of result outputs for the current session. The session panel and the REPL UI panels provide the developer with useful at-a-glance information to aid the developer's workflow and code refinement process.

FIG. 2 illustrates an example card editor user interface 2000 for a programming notebook, as generated using one embodiment of the programming notebook system of FIG. 6. The card editor user interface 2000 may be displayed in response to the developer's selection of an option to create a new card based on the current session. The card editor user interface 2000 may be initialized by the programming notebook system 100 to include program code content associated with the current session in the main programming workflow UI. In particular, the program code may be accessed from the transcript associated with the current session and displayed in a first user-editable text area 202 by which the developer can edit the program code (e.g., add or remove lines, insert code comments and specifications, and other general code clean up and maintenance). In one embodiment the entire contents of the current session transcript may be displayed in the card editor for the developer to edit. In another embodiment, the main programming workflow user interface may include user-selectable options for the developer to select one or more program code cells from which to extract program code for the card editor.

The card editor user interface 2000 may also include a second user-editable text area 204 by which the developer may optionally provide user interface code to be associated with the program code logic of the card. For example, as shown in FIG. 2, HTML and JavaScript may be input by the developer to generate a web-based UI component for the card. Then, when the card is used in subsequent programming notebook sessions, the programming notebook system 100 can interpret the UI code for the card in order to cause display of the UI component directly within the programming notebook UI (for example, as show in program cell 104 of the programming workflow user interface in FIG. 1).

The card editor user interface 2000 also provides options for the developer to provide a description and one or more tags to be associated with the card when it is saved. The description and/or tags may be searchable by other users of the programming notebook system 100 to facilitate re-use of cards across many developer sessions. When the developer is satisfied with the card's settings, a save option may be selected in order to save the card, for example in the program code card repository 170. After the card is saved, the card editor user interface 3000 may be closed (automatically or manually) and the developer can return to the main programming workflow UI. If the developer desires, one or more program cells (for example, those that were used as inputs to the card) may be removed from the workflow by using the respective delete options. However, in some embodiments, the program cell may not also be removed from the transcript. That is, in some instances, the transcript is implemented as immutable log of everything that happens in the workflow, including deletion events. Thus, deletion of a program cell may be more like hiding, in that the transcript still maintains a copy of the deleted cell. Then, the transcript view could be augmented to show or indicate when an entry in the transcript no longer exists in the main programming workflow UI (e.g., this may be visually indicated to the user via some formatting change, an icon, and so on).

FIG. 3 illustrates an example programming workflow user interface 3000 for a programming notebook including one or more automatically generated data visualizations, such as example visualizations 302A, 302B, and 302C of FIG. 3, as generated using one embodiment of the programming notebook system of FIG. 6. The data visualizations may be of particular benefit to the developer in the context of database queries in order to quickly view query results and assess whether the query needs to be revised or tweaked to improve the quality of the output results. The data visualizations 302 (including 302A, 302B, and 302C) shown in user interface 3000 are user-selectable image thumbnails or miniaturized visualizations of the actual output results. In response to the user selecting one of the data visualizations, a larger corresponding version of the same data may be displayed in the main workflow of the user interface 3000 to enable the developer to explore the output results. A variety of data visualizations, ranging from thumbnail to normal to large sized, may be generated and displayed, including but not limited to time series, histograms, tables, graphics, heat maps, and other types of data charts and visualizations.

Figure 4:
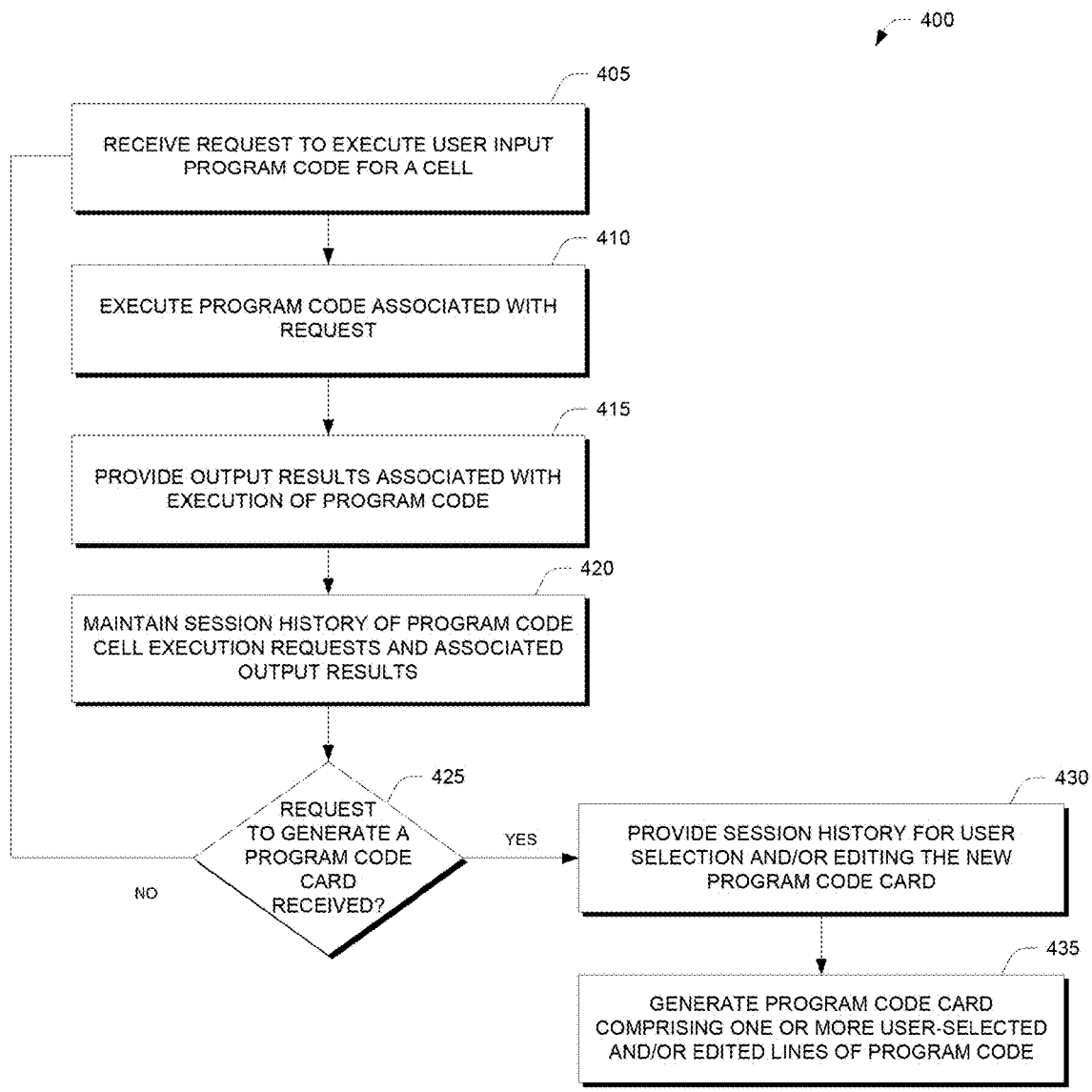
FIG. 4 is a flowchart for one embodiment of an example process for generating and storing logical units of program code using a dynamic programming notebook user interface, as used in one embodiment of the programming notebook system of FIG. 6.
Figure 5:
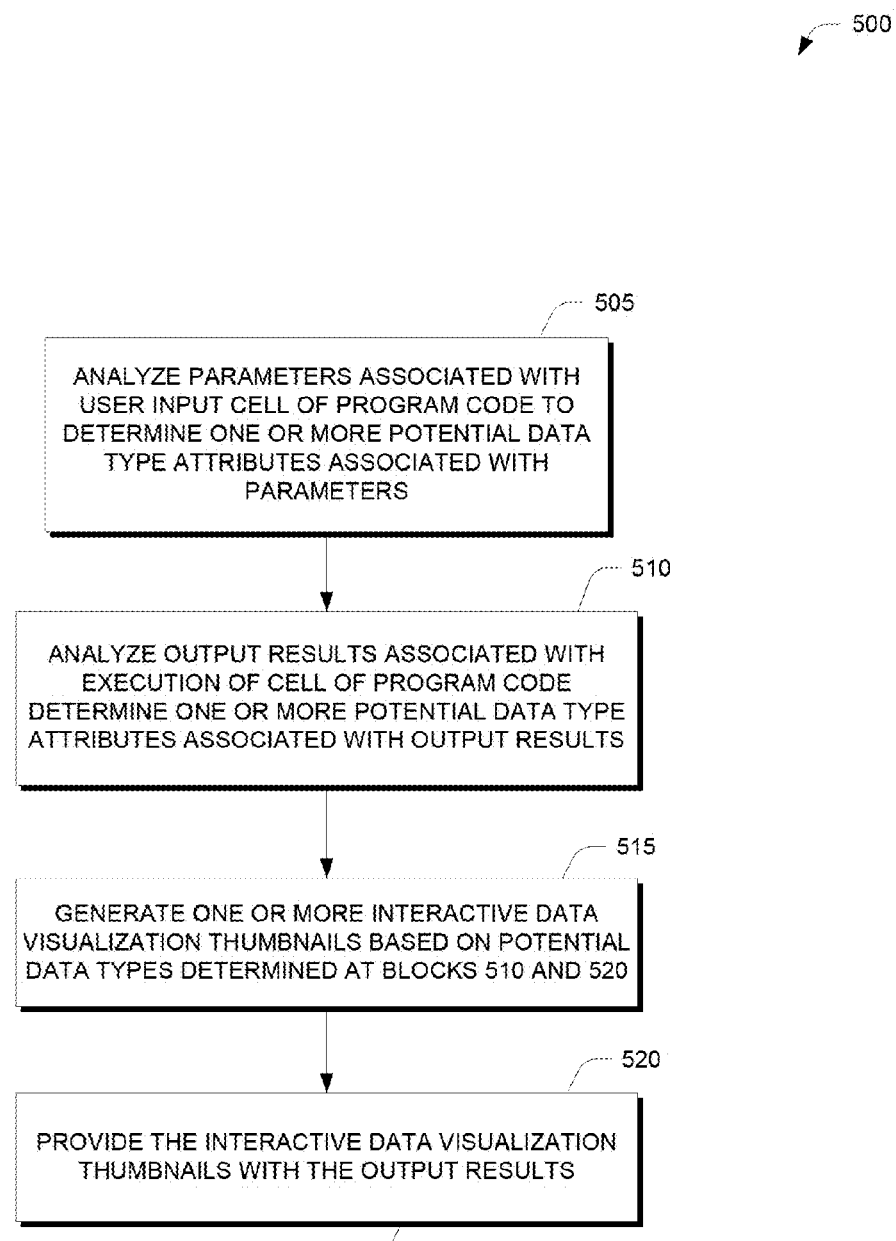
FIG. 5 is a flowchart for one embodiment of an example process for automatically determining one or more data visualizations to provide with output results generated in response to a program code execution request, as used in one embodiment of the programming notebook system of FIG. 6.

The data visualizations 302 shown in user interface 3000 may be generated, for example, in accordance with the process 500 illustrated and described with reference to FIG. 5 herein. In particular, the data visualizations may be automatically selected for generation and generated based at least in part on an analysis of the type of data returned with the output results. For example, the programming notebook system 100 may analyze the output results, determine that the output results include geographic data (such as latitude and longitude coordinates), and generate a map data visualization, such as visualization 302A, for display with the output results in the main programming workflow user interface Examples of Processes Performed by Programming Notebook Systems FIGS. 4 and 5 are flowcharts illustrating various embodiments of programming notebook system processes. In some implementations, the processes are performed by embodiments of the programming notebook system 100 described with reference to FIG. 6 and/or by one of its components, such as the such as the code compiler and execution module 122, the program code card management module 126, or the data (column) introspection module 128. For ease of explanation, the following describes the services as performed by the programming notebook system 100. The example scenarios are intended to illustrate, but not to limit, various aspects of the programming notebook system 100. In one embodiment, the processes can be dynamic, with some procedures omitted and others added.

Generating Logical Units of Program Code

FIG. 4 is a flowchart illustrating one embodiment of a process 400 for generating and storing logical units of program code using a dynamic programming notebook user interface, as used in one embodiment of the programming notebook system 100 of FIG. 6. Depending on the embodiment, the method of FIG. 4 may include fewer or additional blocks and the blocks may be performed in an order that is different than illustrated.

The process 400 begins at block 405 where the programming notebook system receives a request to execute user input program code for a cell, such as input provided by a developer interacting with the programming workflow user interface 1000. This aspect of the process may be referred to as the "read" part of a read-eval-print loop (REPL). The request to execute program code may include one or more lines of program code of varying complexity and may include operations such as, but not limited to, initiating a database connection, submitting queries to the database, defining variables and functions, inserting code comments and markup, and so on. The programming notebook system 100 may be configured to support a wide variety of programming languages, including but not limited to Scala, Python, HTML, JavaScript, Ruby, and so on.

At block 410, the programming notebook system 100 executes the program code associated with the request. This may be, for example, the "eval" part of REPL. The program code received with the request is evaluated and executed to produce output results. The output results may include a wide range of programmatic outputs including no output (e.g., a simple return), a Boolean value, a variable, a value, search query results, and the like. As discussed further herein, the output results may further include, or be analyzed to include, one or more data visualizations which may be of possible interest to the developer based on any inputs in the program code and/or based on the output results.

At block 415, the programming notebook system 100 provides the output results associated with execution of the program code, e.g., as produced at block 410. This aspect of the process corresponds to the "print" part of the REPL. The output results may be presented or configured for presentation in the programming workflow user interface 1000, for example below the program cell used by the developer to input the program code for the request.

At block 420 the programming notebook system 100 maintains the session history of program code cell execution requests and the associated output results. The session history may be maintained and used by the programming notebook system 100 in memory 130 (e.g., for the duration of the current session or as the developer switches between multiple sessions) or stored for later access and retrieval (e.g., in one of the other data sources 174 of FIG. 6). The session history may be used to, for example, generate a transcript of the current session in response to the user's selection of the view transcript option (see, e.g., FIG. 1). The session history may be used to generate or initialize a card editor user interface, as further described below.

At block 425 the programming notebook system 100 determines whether a request to generate a program code card has been received. If such a request has not been received, then the process 400 may return to block 405 and continue processing program code execution requests in the REPL from blocks 405 to 415 as many times as the developer would like.

In response to a request to generate a program code card has been received, the process may proceed to block 430. At block 430, the maintained session history is provided to allow the user to select and/or edit program code for the program code card. For example, the maintained session history may include all program code, organized by respective cells, which the user provides as input for the current session. The program code may be displayed, for example, as a listing of program code in a user-editable text area within a card editor user interface, such as the card editor user interface 2000 of FIG. 2. As discussed with reference to FIG. 2, the card editor UI may also enable the user to add additional program code for an associated UI component for the card.

When the user has completed editing of the program code, associated UI code, description, and/or tags, she can select the "Save" (or similar) option. In response, at block 435, the programming notebook system 100 generates the program code card comprising one or more user selected and/or edited lines of program code. Once the program card code has been generated the programming notebook system 100 can store the program code card, for example at the program code card repository 170.

Determining Data Visualizations to Provide with Program Code Output Results

FIG. 5 is a flowchart illustrating one embodiment of a process 500 for automatically determining one or more data visualizations to provide with output results generated in response to a program code execution request, as used in one embodiment of the programming notebook system 100 of FIG. 6. Depending on the embodiment, the method of FIG. 5 may include fewer or additional blocks and the blocks may be performed in an order that is different than illustrated.

The process 500 begins at block 505 where the programming notebook system 100 analyzes parameters associated with the program code provided by the user at a cell in the main programming workflow UI to determine one or more potential data type attributes associated with the input parameters. For example, the program code to be executed might include one or more input parameters of a particular data type which may suggest what type of data the output results will be.

At block 510, the programming notebook system 100 analyzes the output results associated with execution of the program code for the cell to determine one or more potential data type attributes associated with the output results. For example, if the output results comprise a table of data (e.g., rows and columns) then the columns and/or data values may be analyzed to identify the type of data associated with each column. For example, if the output results table of data includes column headers, these headers may contain contextual information to indicate the type of data (e.g., a column labeled with the word "DATE" is likely to be a date data attribute, a column labeled with the word "CITY" is likely to be a geographical data attribute, and so on). Further, the output results data table values may be parsed and analyzed to determine probable data types, in particular if no column headings or other metadata is available. For example, values in the format "###-##-##" may be analyzed and interpreted by the programming notebook system 100 to indicate that the value is likely to be a date data attribute. In other examples standard formats may be analyzed and compared to results data to identify probable matches or data types including latitude and longitude coordinates, geographic abbreviations, special symbols which may indicate the data type (e.g., currency symbols).

At block 515, the programming notebook system 100 generates one or more interactive data visualization thumbnails based on the potential data types identified at blocks 505 and 510. The data visualization thumbnails may include one or more of a time series, a histogram, a table, a heat map, a geographic map, a scatter plot, a line graph, a pie chart, or any other type of data visualization. Whether and which data visualization thumbnails are selected may depend on the detected data types (and/or probable data types) and/or combinations of data types. For example, if geographic data types are identified, a geographic map may be generated as one of the data visualizations. Or, if date and time data types are identified, a time series or a calendar may be generated as data visualizations. The data visualizations may be generated based on the actual output results to provide an accurate view of the data.

At block 520, the programming notebook system 100 provides the interactive data visualization thumbnails with the output results. The interactive data visualizations may then be displayed with the output results, for example in the programming workflow user interface 3000 above or below the program cell used by the developer to input the program code for the request. The data visualizations may be configured to respond to user interaction by, for example, causing display of a larger non-thumbnail version of the data visualization in the programming workflow user interface 3000. The larger non-thumbnail version may be fully interactive and support user functionality such as zooming in our out, manipulating parameters, selecting portions of the visualization to filter results, and so on.

Example System Implementation and Architecture

FIG. 6 is a block diagram of one embodiment of a programming notebook system 100 in communication with a network 160 and various systems, such as client computing systems(s) 168, program code card repository 170, and/or other data source(s) 172. The programming notebook system 100 may be used to implement systems and methods described herein, including, but not limited to the processes 400 of FIG. 4 and the process 500 of FIG. 5.

Programming Notebook System

In the embodiment of FIG. 6, the programming notebook system 100 includes a code compiler and execution module 122, a program code card management module 126, a data (column) introspection module 128, and a user interface module 124 that may be stored in the mass storage device 120 as executable software codes that are executed by the CPU 150. These and other modules in the programming notebook system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 6, the programming notebook system 100 is configured to execute the modules recited above to perform the various methods and/or processes herein (such as the processes described with respect to FIGS. 4 and 5 herein).

The code compiler and execution module 122 provides capabilities related to execution of program code associated with requests received by the programming notebook system 100, for example as described by the process 400 of FIG. 4. The program code card management module 126 provides capabilities related to storing and searching program code cards, some aspects of which are described by the process 400 of FIG. 4 and/or the user interface 1000 of FIG. 1. The data (column) introspection module 128 provides capabilities related to analyzing inputs and outputs associated with executed program code to automatically identify potential data visualizations which may be of use to the end user, for example as described by the process 500 of FIG. 5. The user interface module 124 provides capabilities related to generation and presentation of one or more user interfaces, such as the sample user interfaces illustrated with reference to FIGS. 1, 2, and 3 herein.

The programming notebook system 100 includes, for example, a server, workstation, or other computing device. In one embodiment, the exemplary programming notebook system 100 includes one or more central processing units ("CPU") 150, which may each include a conventional or proprietary microprocessor. The programming notebook system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules of the programming notebook system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA"), and Extended ISA ("EISA") architectures, for example. In addition, the functionality provided for in the components and modules of programming notebook system 100 may be combined into fewer components and modules or further separated into additional components and modules.

The programming notebook system 100 is generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the programming notebook system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary programming notebook system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The programming notebook system 100 may also include one or more multimedia devices 140, such as speakers, video cards, graphics accelerators, and microphones, for example.

Network

In the embodiment of FIG. 6, the I/O devices and interfaces 110 provide a communication interface to various external devices. In the embodiment of FIG. 6, the programming notebook system 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 6, in some embodiments information may be provided to or accessed by the programming notebook system 100 over the network 160 from one or more program code card repository 170 and/or other data source(s) 172. The program code card repository 170 may store, for example, logical units of program code (e.g., "cards") generated using the methods described herein. The program code card repository 170 and/or other data source(s) 172 may include one or more internal and/or external data sources. In some embodiments, one or more of the databases or data sources may be implemented using a relational database, such as Sybase, Oracle, CodeBase, MySQL, and Microsoft® SQL Server as well as other types of databases such as, for example, a flat file database, an entity-relationship database, and object-oriented database, and/or a record-based database Other Embodiments Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the programming notebook system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the programming notebook system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computer-implemented method comprising:
under control of a hardware computing device configured with specific computer executable instructions:
receiving, on behalf of a user interacting with a programming notebook user interface in a programming session, a request to execute a unit of program code associated with a program cell in the programming notebook user interface, wherein the unit of program code comprises one or more units of program code;
executing, on behalf of the user, the unit of program code to obtain an output result associated with execution of the unit of program code;
automatically determining, based at least in part on an attribute of the output result, one or more data visualizations, wherein the one or more data visualizations provide various ways of visualizing data of the output result, and wherein the attribute includes at least a data type of the output result;
in response to determining that the data type is a date, determining a time series as at least one of the one or more data visualizations;
in response to determining that the data type is a geographic unit of measurement, determine a map as at least one of the one or more data visualizations;
transforming the output result into one or more formats to generate the one or more data visualization based on the output result;
generating, for each of the one or more data visualizations, respective interactive thumbnails of the one or more data visualizations;
providing the output result and the interactive thumbnails of the one or more data visualizations for display immediately below the program cell and side-by-side in the programming notebook user interface, wherein each of the interactive thumbnails is individually interactive and selectable to view respective larger versions of the respective data visualizations corresponding to the respective interactive thumbnails, and wherein the program cell and the interactive thumbnails of the one or more data visualizations are displayed simultaneously in the programming notebook user interface;
maintaining a session history of requests to execute units of program code received in association with a programming notebook user interface;
receiving a request to generate a program code card for the programming session;

providing a program code card editor user interface including at least an aggregate listing of the units of program code associated with the session history, wherein the aggregate listing includes, for each unit of program code, an indicator label of the associated program cell in the programming notebook user interface;

receiving, via the program code card editor user interface, user input comprising a selection of program code for the program code card; and generating the program code card based at least in part on the user input.

2. The computer-implemented method of claim 1, further comprising:

under control of the hardware computing device configured with specific computer executable instructions:

receiving a request, by the programming notebook user interface, to import the program code card into a second programming session; and importing the program code card into the second programming session, such that an end user can execute, by providing user input to the programming notebook user interface, the unit of program code associated with the program code card.

3. The computer-implemented method of claim 1, further comprising receiving a request, via the programming notebook user interface, user input comprising one or more input parameters and an instruction to execute the program code card according to the one or more input parameters.

4. The computer-implemented method of claim 1, wherein the one or more data visualizations are interactive.

5. The computer-implemented method of claim 1, further comprising:

under control of the hardware computing device configured with specific computer executable instructions:

in response to a second user input selecting a first interactive thumbnail of the interactive thumbnails of the one or more data visualizations, providing for display a larger version of the data visualization corresponding to the first interactive thumbnail within the programming notebook user interface and below the program cell, wherein the larger version of the data visualization corresponding to the first thumbnail is interactive for at least one of: zooming in and out, manipulating parameters, or selecting portions.

6. The computer-implemented method of claim 5, further comprising:

under control of the hardware computing device configured with specific computer executable instructions:

in response to a third user input selecting a portion of the larger version of the data visualization corresponding to the first thumbnail, filtering the output result and automatically determining an updated one or more data visualizations based on the filtered output result.

7. A computing system for providing a programming notebook, the computing system comprising:

a non-transitory storage medium storing software modules; and one or more hardware computer processors configured to execute software modules to cause the one or more hardware computer processors to:

receive, on behalf of a user interacting with a programming notebook user interface in a programming session, a request to execute a unit of program code associated with a program cell in the programming notebook user interface, wherein the unit of program code comprises one or more lines of program code;

execute, on behalf of the user, the unit of program code to obtain an output result associated with execution of the unit of program code;

analyze the output result to determine the attributes or values of output data comprising the output result, wherein the attributes or values include at least a data type of the output result;

automatically determine, based at least in part on the attributes or values of the output result, a plurality of data visualizations, wherein the plurality of data visualizations comprise a plurality of built in formats for displaying and visualizing the output data of the output result;

in response to determining that the data type is a date, determine a time series as at least one of the plurality of data visualizations;

in response to determining that the data type is a geographic unit of measurement, determine a map as at least one of the plurality of data visualizations;

transform the output result using one or more of the formats to generate the plurality of data visualization based on the output result;

generate, for each of the plurality of data visualizations, respective interactive thumbnails of the plurality of data visualizations;

provide the output result and the interactive thumbnails of the plurality of data visualizations for display immediately below the program cell and side-by-side in the programming notebook user interface, wherein each of the interactive thumbnails is individually interactive and selectable to view respective larger versions of the respective data visualizations corresponding to the respective interactive thumbnails, and wherein the program cell and the interactive thumbnails of the plurality of data visualizations are displayed simultaneously in the programming notebook user interface;

maintain a session history of a plurality of requests of previously executed units of program code and associated output results;

receive a request to generate a program code card for the programming session;

provide a program code card editor user interface including at least an aggregate listing of lines of program code associated with respective units of program code associated with requests of the session history;

receive, via the program code card editor user interface, user input comprising a selection of program code for the program code card;

generate the program code card based at least in part on the user input; and add the program code card to a selectable list of program code cards included in the programming notebook user interface.

8. The computing system of claim 7, wherein the user input further comprises at least some user interface code.

9. The computing system of claim 7, wherein the user input further comprises at least a description or a tag for the program code card.

10. The computing system of claim 7, wherein at least one of the plurality of data visualizations comprises at least one of: a time series, a scatter plot, a histogram, a chart, a bar graph, a map, or a table.

11. The computing system of claim 7, wherein the one or more hardware computer processors are further configured to execute the software modules to cause the one or more hardware computer processors to:
- in response to a second user input selecting a first interactive thumbnail of the interactive thumbnails of the plurality of data visualizations, provide for display a larger version of the data visualization corresponding to the first interactive thumbnail within the programming notebook user interface and below the program cell, wherein the larger version of the data visualization corresponding to the first thumbnail is interactive for at least one of: zooming in and out, manipulating parameters, or selecting portions.

12. The computing system of claim 11, wherein the one or more hardware computer processors are further configured to execute the software modules to cause the one or more hardware computer processors to:
- in response to a third user input selecting a portion of the larger version of the data visualization corresponding to the first thumbnail, filter the output result and automatically determine an updated plurality of data visualizations based on the filtered output result.

13. The computing system of claim 7, wherein the plurality of data visualizations are interactive.

* * * * *